United States Patent [19]
Ishimine et al.

[11] Patent Number: 6,137,682
[45] Date of Patent: Oct. 24, 2000

[54] AIR-COOLED ELECTRONIC APPARATUS

[75] Inventors: Junichi Ishimine; Masahiro Suzuki, both of Kawasaki, Japan

[73] Assignee: Fujitsu Limited, Kanagawa, Japan

[21] Appl. No.: 09/227,964

[22] Filed: Jan. 11, 1999

[30] Foreign Application Priority Data

Jul. 28, 1998 [JP] Japan .................................. 10-213020

[51] Int. Cl.$^7$ ..................................................... H05K 7/20
[52] U.S. Cl. .......................... 361/704; 361/687; 361/695; 361/700; 361/701; 361/717; 257/713; 257/718; 165/104.33; 165/104.21; 174/15.2
[58] Field of Search .................................... 361/676, 687, 361/694, 695, 699, 702, 700, 704, 705, 744, 701, 714, 719, 784, 785, 788, 717–718; 165/80.3, 80.4, 104.33, 185, 104.34, 104.26, 104.21; 62/259.2; 29/741, 740, 890.032, 842; 257/713, 718, 706–727; 174/15.2, 16.3, 252

[56] References Cited

U.S. PATENT DOCUMENTS

| 4,104,700 | 8/1978 | Hutchison et al. ...................... 361/694 |
| 5,162,974 | 11/1992 | Currie ....................................... 361/702 |
| 5,227,663 | 7/1993 | Palti et al. ................................ 257/718 |
| 5,339,214 | 8/1994 | Nelson ...................................... 361/695 |
| 5,339,215 | 8/1994 | Nishiguchi .............................. 361/704 |
| 5,343,358 | 8/1994 | Hilbrink .................................. 361/700 |
| 5,343,940 | 9/1994 | Jean ..................................... 165/104.33 |
| 5,390,734 | 2/1995 | Voorhes et al. ......................... 165/185 |
| 5,394,936 | 3/1995 | Budelman ............................... 361/699 |
| 5,504,924 | 4/1996 | Ohashi et al. .......................... 361/676 |
| 5,549,155 | 8/1996 | Meyer et al. ....................... 165/104.33 |
| 5,946,191 | 8/1999 | Oyamada ................................ 361/700 |
| 6,021,044 | 2/2000 | Nevilee, Jr. ............................. 361/700 |

*Primary Examiner*—Leo P. Picard
*Assistant Examiner*—Michael Datskovsky
*Attorney, Agent, or Firm*—Armstrong, Westerman, Hattori, McLeland & Naughton

[57] ABSTRACT

An electronic apparatus includes a circuit board, a connector provided on the circuit board, an integrated circuit module attached to the connector, and a heat sink attached to the integrated circuit module. A heat transfer device is disposed at a position separate from the heat sink and arranged in a cooling air passageway. A heat conduction path thermally connects the heat sink with the heat transfer device. Since the heat transfer device can be arranged outside the frame of the apparatus, the heat transfer device can be constructed to have a sufficient cooling capacity, while the integrated circuit module and the heat sink can be constructed in a relatively compact design.

11 Claims, 8 Drawing Sheets

AIR-COOLED ELECTRONIC APPARATUS

BACKGROUND OF THE INVENTION

1. Field of the Invention

The present invention relates to an air-cooled electronic apparatus.

2. Description of the Related Art

Recently, in an electronic apparatus such as a high-end server or a super computer, attempts have been made to form a processor from a high density integrated circuit module to obtain higher performance. Further, attempts have been made to form a system from a plurality of processors so that higher performance is achieved by parallel processing.

The integrated circuit module forming the processor has one or more highly integrated chips, such as a CMOS chip, mounted at high density and operates at high speed. The amount of heat generated from each chip and the integrated circuit module is very large and therefore it is important to effectively and economically remove the generated heat.

When the system is constructed from a plurality of processors, processors are generally mounted in such a way that a plurality of integrated circuit modules are mounted to a single circuit board for the purpose of wiring each of the processors to the others. In such a case, for example, soldering is used for mounting the integrated circuit module to the circuit board. According to this circuit board structure, the electronic apparatus is shipped from a factory either in the condition that all the integrated circuit modules to be mounted are attached or in the condition that the integrated circuit modules required by the customer at the time of delivery are attached. Therefore, the customer must handle the circuit board carrying the integrated circuit modules as a unit when, for example, trouble occurs to necessitate replacement of parts, which causes the maintenance cost to increase because the price of a unit is high.

Also, when it is necessary to increase or decrease the number of processors in the system in response to the customer's demand, the circuit board structure must be returned to the factory as a whole, which is a troublesome work. To eliminate such inconveniences, the integrated circuit modules forming the processors are preferably mounted to the circuit board via connectors so that the integrated circuit module is attachable to, and detachable from, the circuit board by the customer. This is convenient because it is sufficient to stock the integrated circuit modules or others as maintenance parts. Also, the integrated circuit module or others handled in such a manner is favorably as small as possible in size. Recently, a technology for realizing such a demand has been strongly desired.

In the prior art electronic apparatus having a cooling system, integrated circuit modules are mounted to a circuit board via connectors to construct a system or a subsystem of an electronic equipment. A heat sink is attached to the integrated circuit module so that the heat sink having a number of heat transfer fins is disposed in a cooling air passageway when the integrated circuit module is mounted to the connector. Heat generated from the integrated circuit module is thus radiated from the heat sink.

As processors have achieved increasingly higher performance, heat generated from the integrated circuit modules has increased. Therefore, it is necessary to increase the cooling capacity as the generated heat increases. In the prior art air-cooling system, the cooling effect is satisfied if the speed of cooling air is in the range from 4 to 5 m/sec when the heat generating density is 3 W/cm$^2$ or less, but it is very difficult to handle generated heat exceeding the above-mentioned value with an air-cooling system.

Therefore, a liquid-cooling system is employed in place of the air-cooling system, to increase the cooling capacity. In the liquid-cooling system, a cold plate through which cooling water is circulated is brought directly, or via a heat sink, into contact with the integrated circuit module to cool the latter. The liquid-cooling system, however, has a drawback in that this necessitates a cold plate and a mechanism for circulating cooling water, including a pump, piping, a heat exchanger or others, which is less economical than the air cooling system.

In the air-cooling system, the area of the heat transfer fins may be enlarged to lower thermal resistance of the heat sink to increase the cooling capacity. However, thermal resistance is not always lowered in proportion to the increase in the area of the heat transfer fins. As the area of the heat transfer fins increases, the size and the weight of the integrated circuit unit, including the integrated circuit module and the heat sink, become larger, which results in difficulty in handling, and necessitates a structural member other than the connector for supporting the weight of these members. Under such circumstances, it is required that the integrated circuit module be easily mounted to the circuit board and be more effectively and economically cooled.

SUMMARY OF THE INVENTION

The object of the present invention is to provide an air-cooled electronic apparatus having an excellent cooling capacity without the need to increase the size of a heat sink.

An electronic apparatus according to the present invention comprises a circuit board, a connector provided on the circuit board, an integrated circuit module attached onto the connector, a heat sink attached to the integrated circuit module, heat transfer means disposed at a position separate from the heat sink and arranged in a cooling air passageway for transferring heat, and a heat conduction path for thermally connecting the heat sink to the heat transfer means.

According to this constitution, since the integrated circuit module generating heat is separated from the air-cooled heat transfer means, the integrated circuit module can be constructed smaller in size and lighter in weight to facilitate the maintenance thereof. That is, the portability of the integrated circuit module or the integrated circuit unit and attachability/detachability of the integrated circuit module or the integrated circuit unit relative to the connector are facilitated. Also, since the air-cooled heat transfer means is disposed at a position separate from the integrated circuit module, it is easy to enlarge the heat transfer means and increase the cooling capacity thereof.

Preferably, the heat conduction path comprises a heat pipe. Since the heat conduction path becomes longer in this cooling system, the thermal resistance is liable to be larger even if a metal having a good heat conductive property, such as copper, is used. If the heat pipe is used, the thermal resistance thereof is reduced to result in a significant improvement in the cooling capacity.

The heat sink has a first thermal terminal, and the heat conduction path has a second thermal terminal capable of being thermally brought into contact with the first thermal terminal.

The second thermal terminal, the heat conduction path and the heat dissipation means form an integral heat transfer unit, and the heat transfer unit is attached to a frame via a heat transfer unit mounting means which has a degree of freedom of the movement in the three-dimensional direction. Since it is difficult to connect the heat transfer means to the heat conduction path and obtain an accurate positioning of the heat conduction path itself, it is not easy to locate the second thermal terminal on the heat transfer side in correspondence to the first thermal terminal on the heat sink side when the integrated circuit module is connected to the connector. To solve such an inconvenience, by providing the heat transfer unit mounting means with a degree of freedom of movement, it is possible to easily position the second thermal terminal and the first thermal terminal.

The heat transfer unit includes a duct for forming the cooling air passageway, and an elastic member is provided between the heat transfer means and the duct or the frame, for biasing the heat transfer means so that the first thermal terminal is brought into contact with the second thermal terminal. In general, it is usual that the thermal connection between the second thermal terminal and the first thermal terminal is provided by interposing a thermal sheet, a thermal grease or a thermal compound, or by a surface-to-surface contact, for example, of a metallic surface having a small surface-roughness. In either case, the contact pressure between the surfaces is an important parameter for the heat conduction. According to the constituent features disclosed in this aspect, it is possible to apply the pressure to the second thermal terminal and the first thermal terminal by the elastic member attached to the heat transfer means when the integrated circuit module is mounted to the connector on the circuit board.

The first thermal terminal and the second thermal terminal may be mechanically coupled with each other (to obtain a more assuredly thermal connection). In this case, there may be a problem in that the electrical connection between the connector and the integrated circuit module is loosened by a load applied thereto if there is no degree of freedom of the movement on the heat transfer unit side. To eliminate such a drawback, the heat transfer unit is preferably a structure having a degree of freedom of movement in three dimensions.

A circuit element other than the integrated circuit module is preferably mounted on the surface of the circuit board on the opposite side from that carrying the connector for mounting the integrated circuit module. Since the integrated circuit module generates a large amount of heat, it is necessary to provide heat transfer means having a high heat transfer efficiency, guaranteeing a sufficient heat transfer area. However, the circuit element provided in the peripheral circuit, or the like, can be sufficiently cooled even by an ordinary air-cooling to the temperature under which they are operable. Since the integrated circuit module is disposed at a position separate from the heat transfer means having a sufficient heat transfer area in this system and the module itself is not air-cooled, it is necessary to supply cooling air for cooling the other circuit elements in the area including the integrated circuit module, which is uneconomical because a blower is required for supplying cooling air. If the other circuit elements are disposed on the surface on the opposite side from that carrying the integrated circuit module as defined above, they are cooled by cooling air supplied to the heat transfer means, which allows a reduction in the number of blowers.

A circuit element, other than the integrated circuit module, is mounted to the surface of the circuit board on the side carrying the connector for mounting the integrated circuit module, the circuit element having a heat sink for the circuit element, the heat sink for the circuit element being thermally connected to the heat transfer means via the heat conduction path. As described above, if the connector, to which the integrated circuit module is mounted, and the circuit element are disposed on both surfaces of the circuit board, the cost for mounting them becomes higher. Also, there is a case wherein the manufacture thereof is difficult. To eliminate such inconveniences, the connector and the circuit element are mounted to the same surface of the circuit board. The heat sink similar to that of the integrated circuit module is attached to the circuit element and is thermally connected to the heat dissipation means via a heat conduction path. If one heat sink is provided to each of the circuit elements in such a case, the heat conduction paths will be complicated because there are a number of circuit elements in many instances. Therefore, one heat sink is preferably allocated to a group of circuit elements.

The heat transfer means may be a device separated from the electronic apparatus carrying the integrated circuit module. If the user wishes to change the number of integrated circuit modules mounted to the circuit board, the size and the structure of the heat transfer means and the heat exchanger having a blower for generating cooling air may also be selected to be suitable for the new specification, thus reducing the installation area.

An introduction part of the second thermal terminal is tapered and made of an elastic material. This facilitates the positioning of apparatuses.

A plurality of electronic equipments are connected to the single heat transfer unit. The number of housings, each constituting a unit of the apparatus, increases in a large-size electronic apparatus. By connecting a plurality of electronic apparatuses to one heat transfer unit, it is possible to reduce the installation space.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
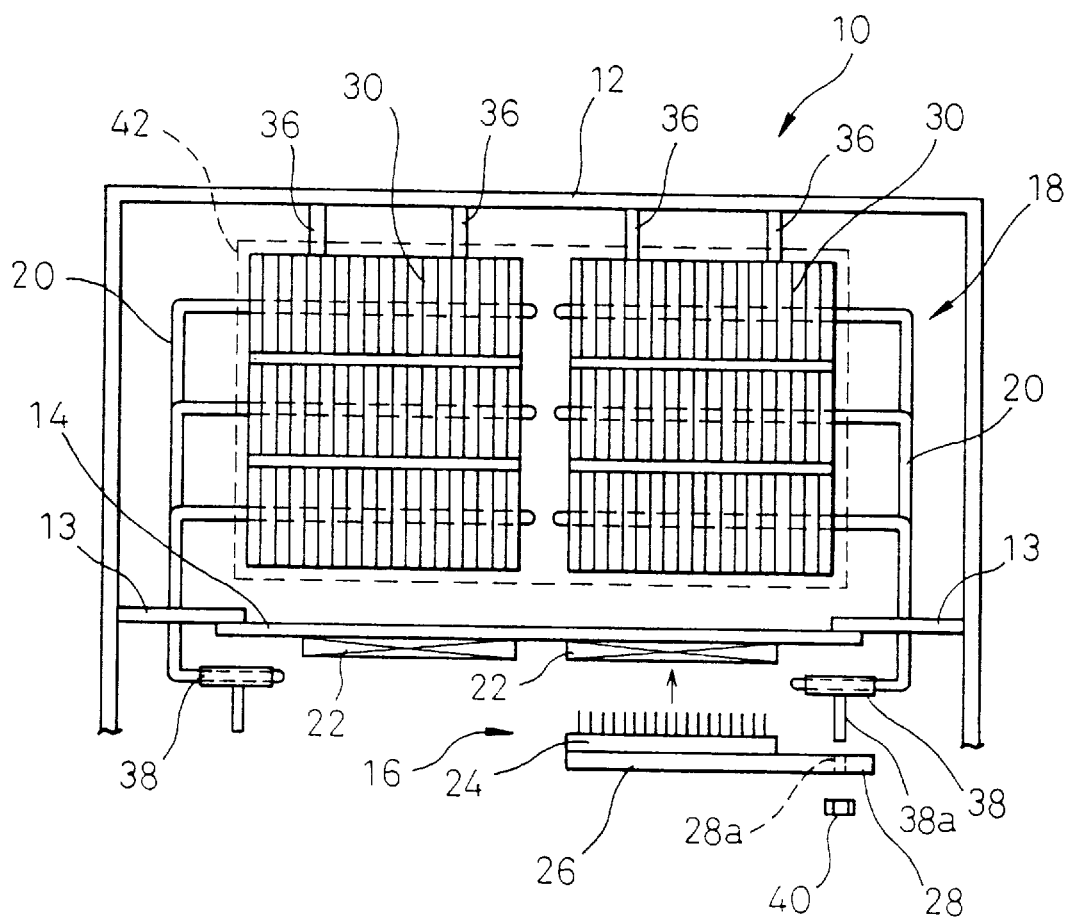
FIG. 1 is a view illustrating an electronic apparatus according to the embodiment of the present invention.
Figure 2:
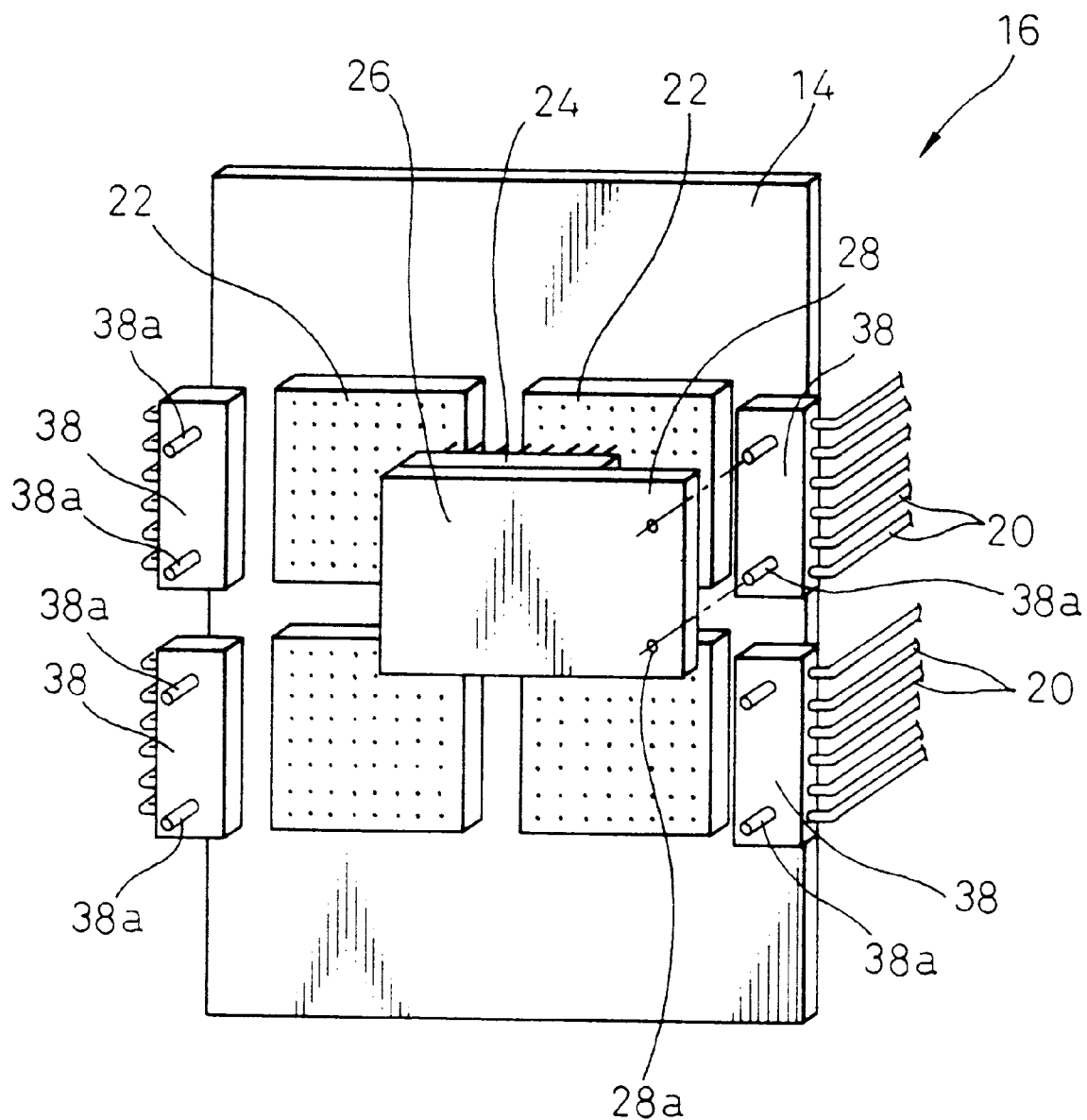
FIG. 2 is a view illustrating the integrated circuit unit in FIG. 1.
Figure 3:
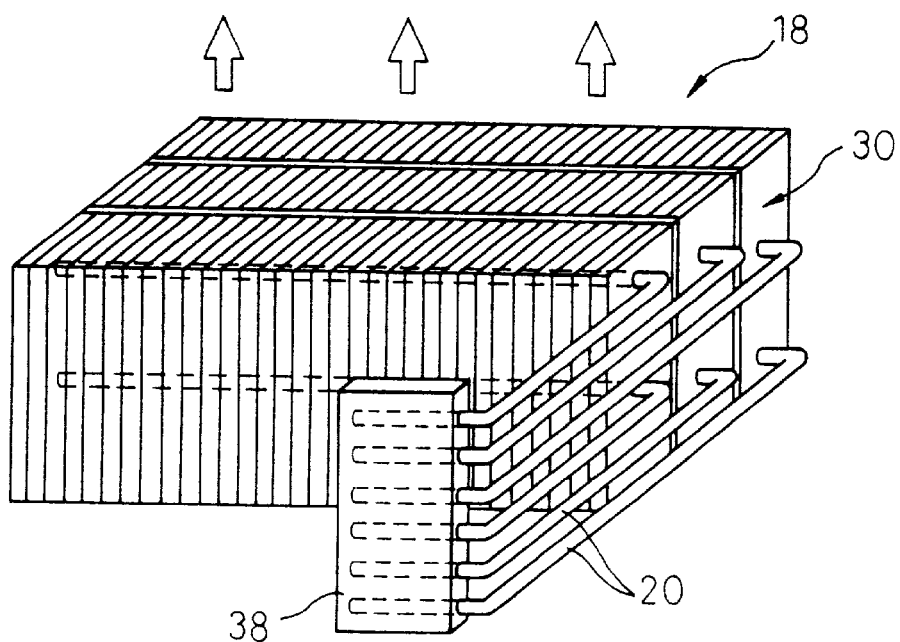
FIG. 3 is a view illustrating the heat transfer unit in FIG. 1.
Figure 4:
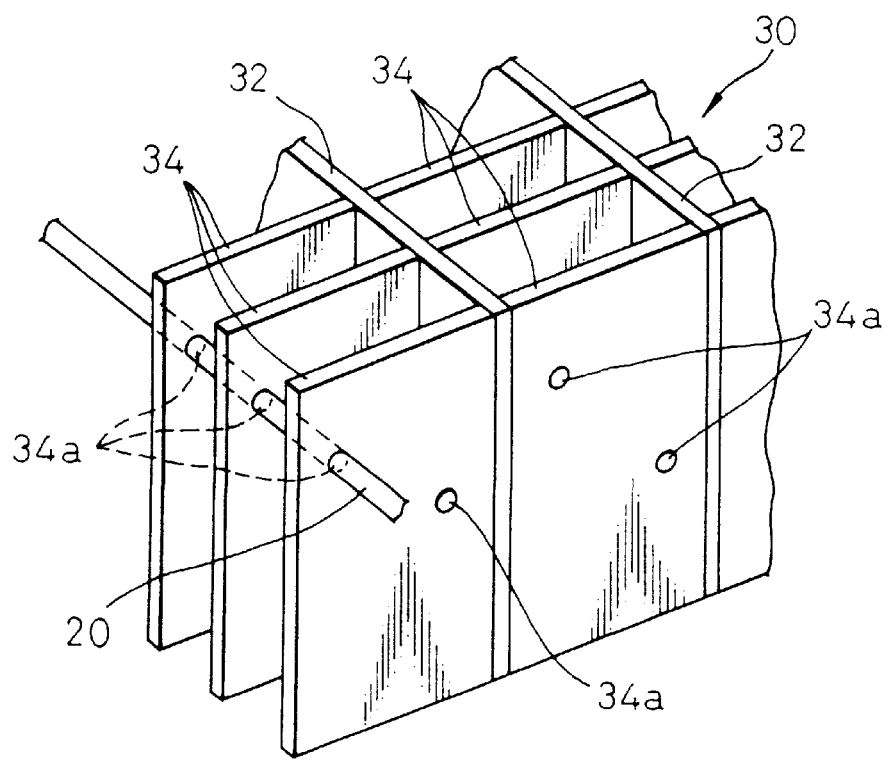
FIG. 4 is a view illustrating a part of the heat transfer means in FIGS. 1 and 3.

With reference to FIGS. 1 to 4, one embodiment of the present invention will now be described. FIG. 1 illustrates the electronic apparatus according to the present invention, FIG. 2 illustrates an integrated circuit unit in FIG. 1, FIG. 3 illustrates a heat transfer unit in FIG. 1, and FIG. 4 illustrates a part of the heat transfer means shown in FIGS. 1 and 3.

The electronic apparatus 10 includes a frame 12, a circuit board 14, an integrated circuit unit 16, a heat transfer unit 18 and a heat conductive path member 20.

The circuit board 14 is attached to the frame 12 by mounting means 13. The circuit board 14 is a circuit board realizing a system or a subsystem for an electronic equipment, such as a computer. A plurality of connectors 22 are provided on one surface of the circuit board 14 so that an integrated circuit module 24 is fitted to the connectors 22. The integrated circuit module 24 functions as a processor. Electronic elements (not shown) other than the integrated circuit module 24 can be mounted co the circuit board 14.

A heat sink 26 is secured to the integrated circuit module 24. The heat sink 26 is made of a metallic plate having a good heat conductivity, such as copper or aluminum, to transmit heat generated from the integrated circuit module 24 to the heat sink 26. The heat sink 26 is larger in size than the integrated circuit module 24, so that a part of the heat sink 26 extended laterally from the integrated circuit module 24 defines a first thermal terminal 28. The integrated circuit unit 16 comprises the integrated circuit module 24, the heat sink 26 and the first thermal terminal 28.

The heat transfer unit 18 includes a heat transfer means 30. As shown in FIG. 4, the heat transfer means 30 comprises a plurality of support plates 32 and a number of fins 34 attached to the support plates 32. The support plates 32 and the fins 34 constitute an integral assembly. The heat transfer unit 18 is attached to the frame 12 by a mounting means 36. The heat transfer means 30 is disposed at a position different from (or separate from) the integrated circuit module 24, and thermally connected to the integrated circuit module 24 via the heat conductive oath member 20.

The heat conductive path member 20 is preferably heat pipes. As shown in FIG. 4, the fins 34 of the heat transfer means 30 arranged in a row have a series of through-holes 34a aligned with each other, and the respective heat pipes pass through the through-holes 34a and are caulked thereto. Thus, the heat conductive path member 20 is brought into thermal contact with the heat transfer means 30 and physically coupled thereto.

A second thermal terminal 38 is provided on the end of the heat conductive path member 20 opposite to that carrying the heat transfer means 30. The second thermal terminal 38 is made of a metallic plate having a good heat conductivity, such as copper or aluminum, and all the heat pipes constituting the heat conductive path member 20 are attached to the second thermal terminal 38. in this regard, the heat pipes constituting the heat conductive path member 20 are coupled to the heat transfer means 30 and the second thermal terminal 38 by a caulking or a heat-conductive adhesive. The heat transfer unit 18 comprises the heat transfer means 30 and the second thermal terminal 38.

The second thermal terminal 38 can be brought into thermal contact with the first thermal terminal 28 of the heat sink 26. For the relative positioning thereof, the second thermal terminal 38 has a pin 38a and the first thermal terminal 28 has a hole 28a. A leading end portion of the pin 38a has a thread, to which a nut 40 is screwed after the pin 38a is inserted into the hole 28a, whereby the second thermal terminal 38 is secured to the first thermal terminal 28.

Further, a duct 42 constituting a cooling air passageway is provided and a blower (not shown) is provided so that cooling air flows through the duct 42. The heat transfer means 30 is arranged the duct 42. With reference to FIG. 3, the cooling air flows in the arrowed direction. The fins 34 of the heat transfer means 30 are arranged in parallel to the flowing direction of the cooling air so that the cooling air cools the fins 34 of the heat transfer means 30. The cooling air in the duct 42 passes through the heat transfer means 30.

According to the above structure, the integrated circuit unit 16 is mounted to the connector 22 attached to the circuit board 14, and the heat transfer unit 18 is attached to the frame 12. The second thermal terminal 38 is brought into thermal contact with the first thermal terminal 28. The electronic apparatus 10 is ready for use. Thereafter, the electronic apparatus 10 is used while supplying the cooling air in the duct 42.

Heat generating from the integrated circuit module 24 is transmitted to the heat transfer means 30 via the heat sink 26, the first thermal terminal 28 on the heat sink side, the second thermal terminal 38 on the heat transfer means side, and the heat conductive path member 20. The heat transmitted to the heat transfer means 30 is radiated into the cooling air flowing in the duct 42 (cooling air passageway). Thereby, the integrated circuit module 24 can be effectively cooled. In this cooling system, since the heat conductive path is relatively long, the thermal resistance becomes considerably large even if metal having a good heat conductivity such as copper is used for the heat conductive path member 20. In the case wherein the heat pipes are used, the thermal resistance in this portion is reduced to a great extent, whereby it is possible to significantly improve the cooling capacity.

By separating the heat transfer means 30 from the integrated circuit module 24 to be cooled in this manner, it is possible to enhance the maintenance ability of the integrated circuit unit 16 because the size and/or weight thereof is reduced. That is, the portability of the integrated circuit unit 16 to be required and the attachment/detachment thereof relative to the connector are facilitated. Also, by the suitable arrangement of the heat transfer means 30, the enlargement in size of the heat transfer means 30 becomes easy to improve the cooling capacity.

Figure 5:
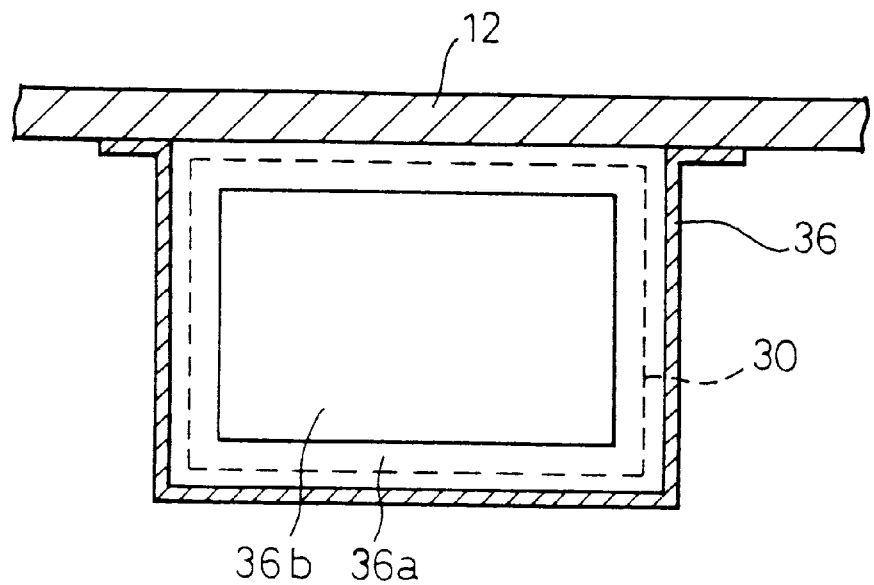
FIG. 5 is a view illustrating a modification of the mounting means for the heat transfer unit.
Figure 6:
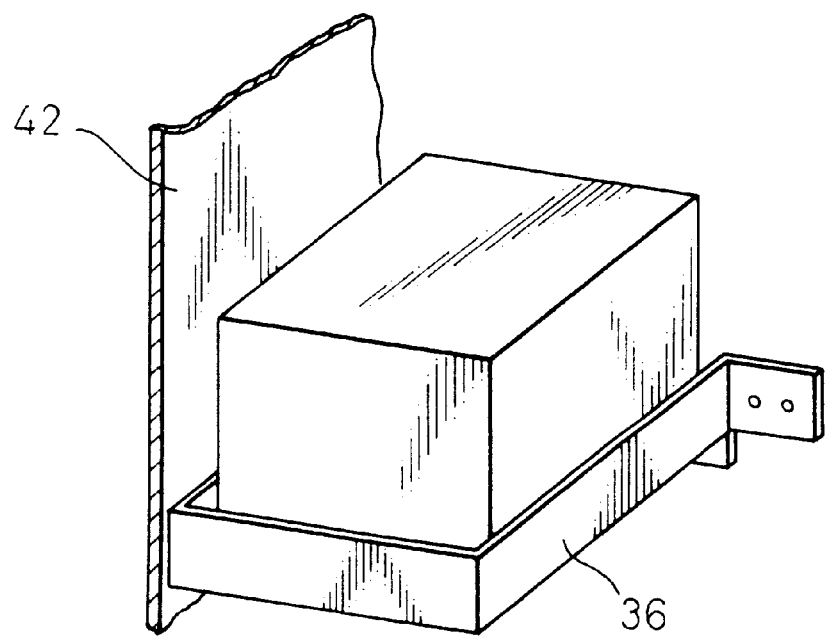
FIG. 6 is a perspective view of the mounting means for the heat transfer unit in FIG. 5.

A modification of mounting means for the heat transfer unit is illustrated in FIGS. 5 and 6. The mounting means 36 for the heat transfer means 30 is a frame member to be attached to the frame 12. The mounting means 36 has a bottom wall 36a having an opening 36b for allowing cooling air to pass therethrough. The heat transfer unit 30 is placed on the bottom wall 36a while leaving a gap between the heat transfer unit 30 and the inner surface of a frame-like is portion of the mounting means 30. Accordingly, the heat transfer unit 30 is movable to some extent while being mounted to the mounting means 36. That is, the mounting means 36 is of a structure having a degree of freedom of the movement in three-dimensional direction. According to this structure, the positioning of the second thermal terminal 38 with the first thermal terminal 28 becomes easy even though it is difficult to connect the heat transfer means 30 with the heat conductive pipe member 20 and to maintain the positional accuracy of the heat path conductive member 20 itself.

Figure 7:
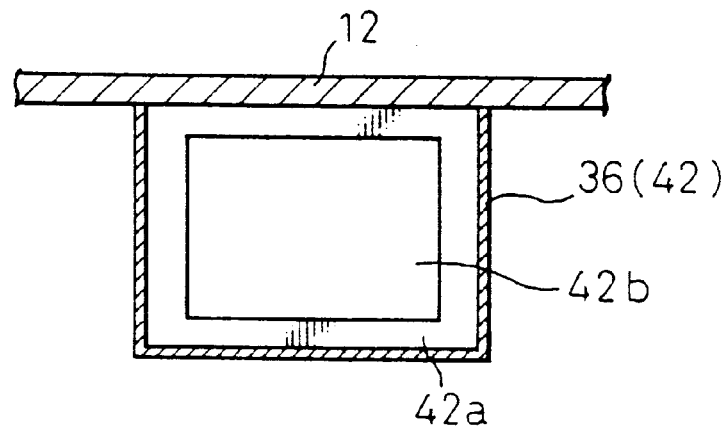
FIG. 7 is a view illustrating a variant of the mounting means for the heat transfer unit.
Figure 8:
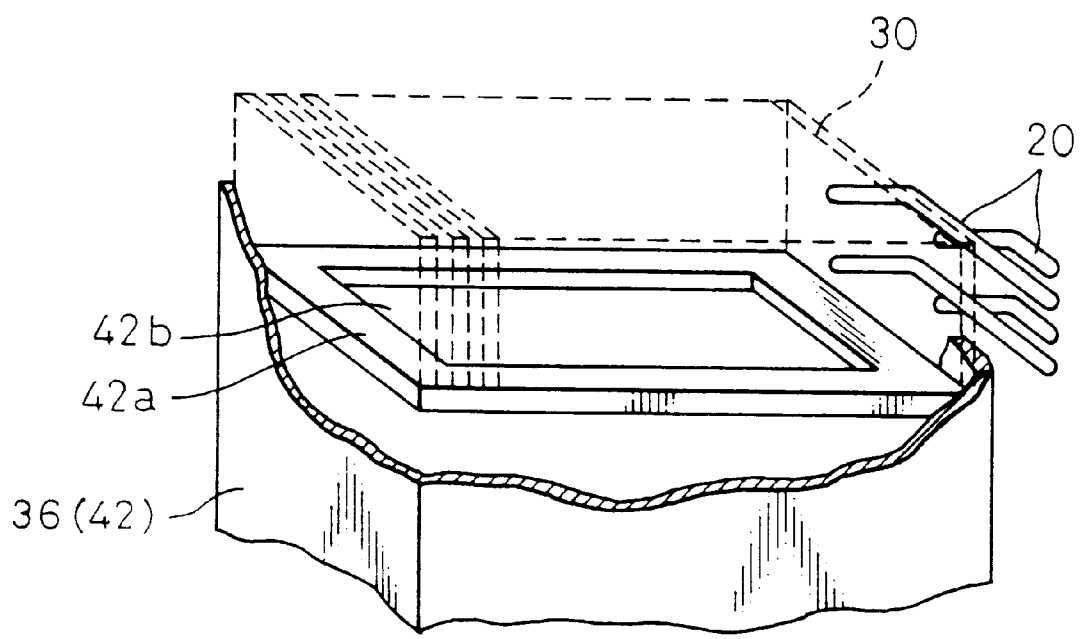
FIG. 8 is a perspective view of the mounting means for the heat transfer unit in FIG. 5.

FIGS. 7 and 8 illustrate another modification of mounting means for the heat transfer unit. According to this modification, mounting means 36 for the heat transfer unit 30 is incorporated in the duct 42. The duct 42 has a transverse support wall 42a having an opening 42b. As in the preceding embodiment, the heat transfer unit 30 is placed on the transverse support wall 42a, and cooling air flows through the opening 42b. Heat conductive path member 20 is inserted into holes provided through the duct 42 and guided along the inner wall thereof. To guide the heat conductive path member 20, horizontal guide grooves may be provided on the inner wall of the duct 42. While the frame 12 constitutes part of the duct 42 in FIG. 7, it is unnecessary for the duct 42 to use part of the frame 12.

Figure 9:
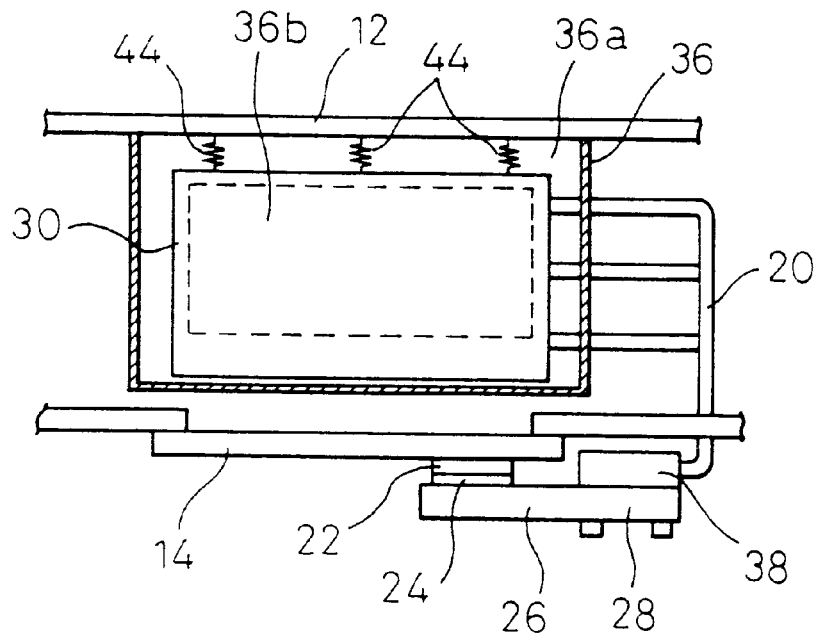
FIG. 9 is a view illustrating a variant of the mounting means for the heat transfer unit.

FIG. 9 illustrates a further modification of mounting means for the heat transfer unit. As in the embodiment shown in FIG. 5, mounting means 36 for the heat transfer unit 30 has a bottom plate 36a having an opening for allowing cooling air to pass therethrough. The heat transfer unit 30 is placed on the bottom plate 36a to be movable to some extent. While the first thermal terminal 28 is mechanically coupled to the second thermal terminal 38 in the embodiment shown in FIG. 1, elastic members (springs) 44 are interposed between the heat transfer means 30 and the frame 12 in this modification. The elastic member 44 biases the heat transfer means 30 in the direction to bring the first thermal terminal 28 into contact with the second thermal terminal 38. In this regard, if the mounting means 36 is formed in a portion of the duct 42, the elastic member 44 may be disposed between the heat transfer means 30 and the duct 42.

To increase the thermal contact between the first thermal terminal 28 and the second thermal terminal 38, it is favorable to interpose a thermal sheet, a thermal grease, a thermal compound or others between the thermal terminals 28 and 38 or minimize a surface roughness of both the thermal terminals 28 and 38. In either case, the contact pressure between the surfaces is an important parameter for the heat conduction. According to the means disclosed in this embodiment, when the integrated circuit module 24 is mounted to the connector 22 on the circuit board 14, it is possible to apply the pressure by the elastic members 44 to the first and second thermal terminals 28 and 38.

Figure 10:
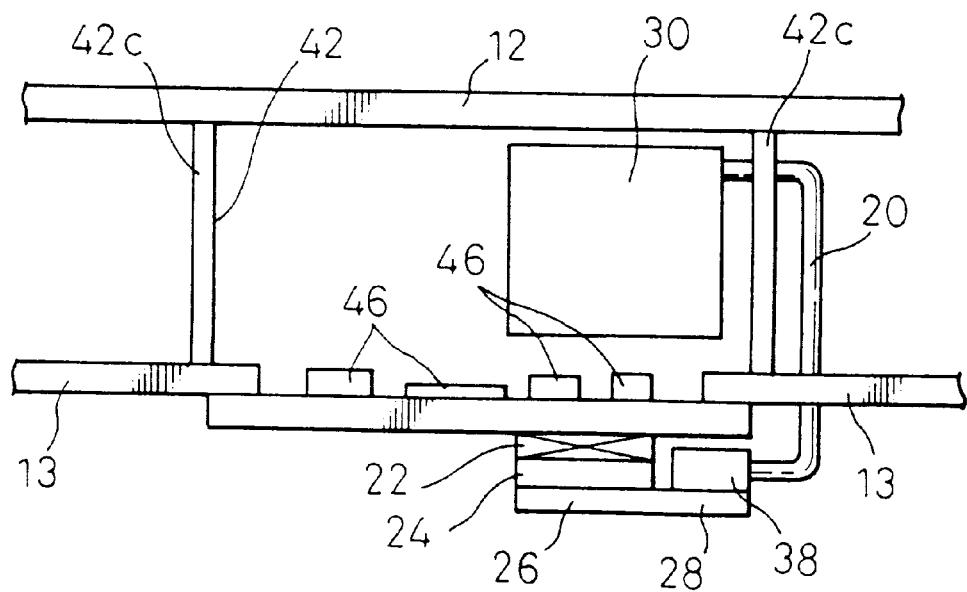
FIG. 10 is a view illustrating an embodiment wherein circuit elements are mounted to the surface of the circuit board on the opposite side from the integrated circuit module.

FIG. 10 illustrates an embodiment wherein circuit elements 46 are mounted to the surface of the circuit board 14 on opposite side from that carrying the integrated circuit module 24. The duct 42 has side walls 42c extending between the frame 12 and mounting means 13 for the circuit board 14, and heat transfer means 30 and the circuit elements 46 are disposed in a cooling air passageway defined within the duct 42. Since the integrated circuit module 24 generates a large amount of heat, the heat transfer means 30 is necessary for guaranteeing a sufficient heat transfer area. Contrarily, the circuit elements 46 disposed on the peripheral circuits are sufficiently cooled to a temperature under which they are operable by an ordinary air cooling system. In this embodiment, the heat transfer means 30 having a sufficient heat transfer area is fixed in the interior of the apparatus. If the circuit elements 46 are mounted to the surface of the circuit board 14 carrying the connector 22, it is necessary to supply cooling air to another surface of the circuit board 14 carrying the integrated circuit module 24 requiring the maintenance. This is uneconomical because a further blower is necessary for supplying the cooling air. To eliminate such a disadvantage, the circuit elements 46 are mounted to the surface of the circuit board 14 closer to the duct 42 so that they are cooled by cooling air supplied to the heat transfer means 30. Thus, it is possible to reduce the number of blowers.

Figure 11:
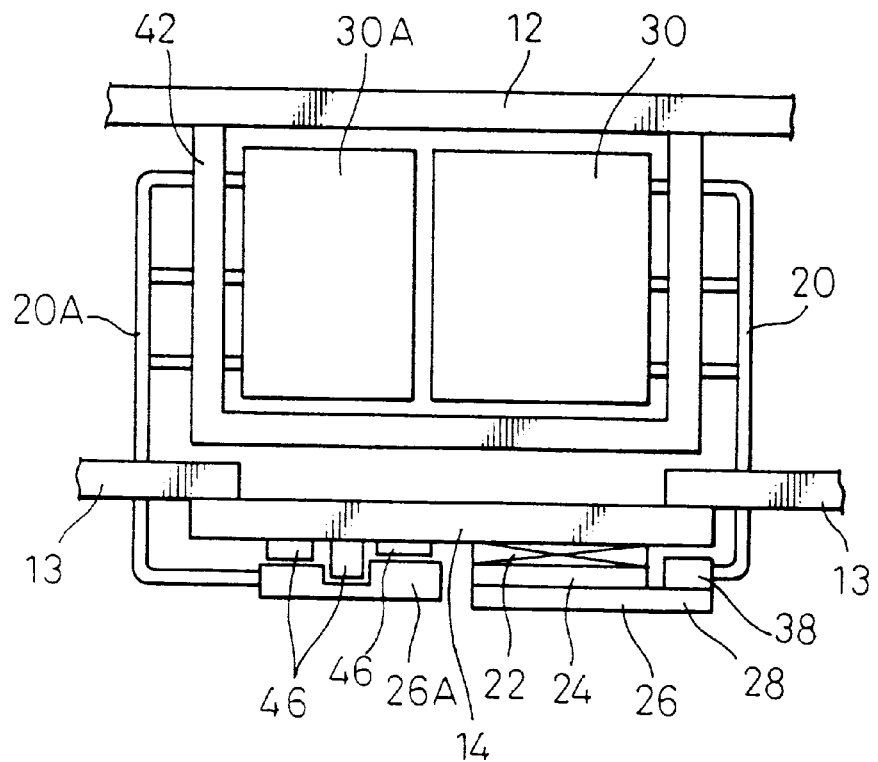
FIG. 11 is a view illustrating another embodiment wherein circuit elements are mounted to the surface of the circuit board on the side of the integrated circuit module.

FIG. 11 illustrates a modification wherein circuit elements 46 are mounted to the surface of the circuit board 14 carrying the integrated circuit module 24. The circuit elements 46 other than the integrated circuit module 24 are mounted onto the same surface of the circuit board 14 as that carrying a connector 22 for the integrated circuit module 24. The circuit elements 46 have a their own heat sink 26A thermally connected to heat transfer means 30A via the heat conductive path member 20A.

If the integrated circuit module 24 and the circuit elements 46 are separately mounted to the either surface of the circuit board 14, respectively, as shown in FIG. 10, the cost for mounting the parts rises. Also, there may be a problem in that the manufacture thereof is difficult. Accordingly, in such a case, it is preferable to mount the integrated circuit module 24 and the circuit elements 46 on the same surface of the common circuit board 14, as shown in FIG. 11.

A duct, or the like, is necessary if cooling means, such as a blower, is provided on the maintenance surface of the circuit board for the purpose of cooling the circuit elements. This results in a problem of increasing the size of the apparatus. In this embodiment, the cooling of the circuit elements 46 is carried out by using the existing duct 42 in the same manner as in the integral circuit module 24. Also, since there are a number of kinds of circuit elements 46 in many cases, if one heat sink 26A is provided to each of the circuit elements 46, the heat conductive path may be complicated. To avoid such inconvenience, one heat sink 26A is preferably allocated to a group of circuit elements 46.

Figure 12:
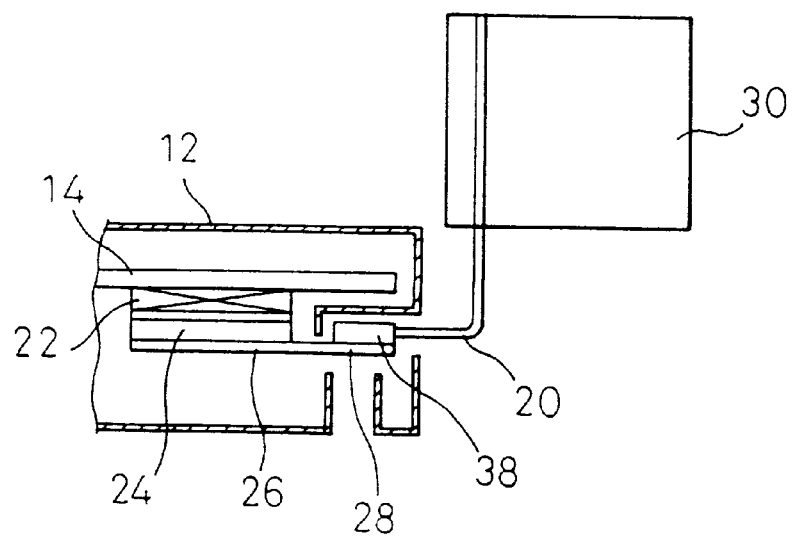
FIG. 12 is a view illustrating another example of the arrangement of heat transfer means.

FIG. 12 illustrates a still further embodiment of the arrangement of heat transfer means 30. The heat transfer means 30 is separated as an independent device from the electronic apparatus carrying the integrated circuit module 24. That is, the heat transfer means 30 is disposed outside the frame 12 to which the integrated circuit module 24 is attached. According to this structure, when the number of integrated circuit modules 24 carried by the circuit board 14 is changed in response to the user's demand, it is possible to prepare an optimum heat exchanger unit having the heat transfer means 30 and a blower of a suitable size and structure in accordance with the number of integrated circuit modules, resulting in the reduction of installation space.

Figure 13:
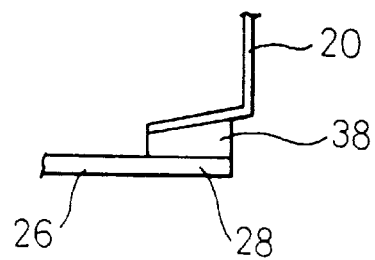
FIG. 13 is a view illustrating a variant of the connecting portion between the first thermal terminal and the second thermal terminal.

FIG. 13 shows a variation of a contact portion between the first thermal terminal 28 and the second thermal terminal 38. An introduction part of the second thermal terminal 38 is formed of a tapered elastic member. That is, an elastic member having a good heat conductivity is attached to the second thermal terminal 38 so that it is brought into contact with the first thermal terminal 28 while being elastically deformed when the second thermal terminal 38 is pressed onto the first thermal terminal 28. Therefore, the thermal contact between the first and second thermal terminals 28 and 38 is facilitated, and the positioning between the apparatuses is also enhanced.

Figure 14:
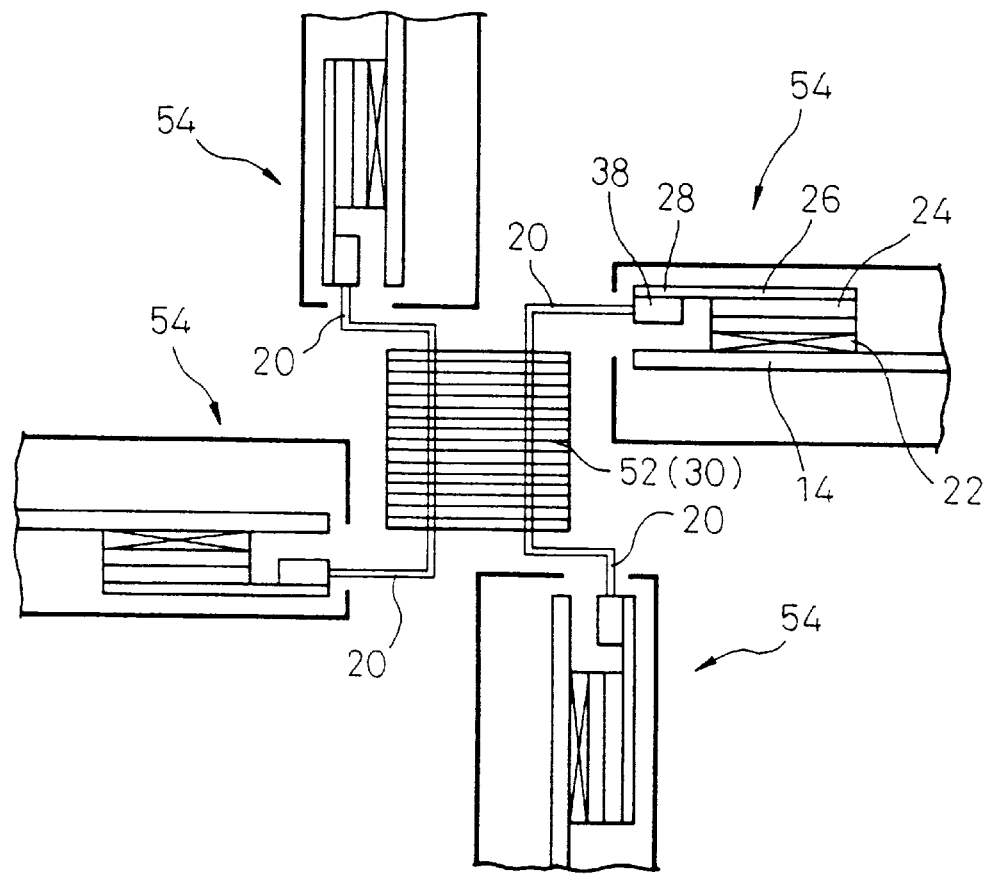
FIG. 14 is a view illustrating an example wherein a plurality of electronic apparatuses are connected to a single heat transfer unit.

FIG. 14 shows an embodiment wherein a plurality of electronic instruments 54 are connected to the single heat dissipation unit 52. In this case, the heat transfer unit 52 comprises one heat transfer means 30 or more. Each of the electronic instruments 54 has a circuit board 14, a connector 22, an integrated circuit module 24, a heat sink 26 and a first thermal terminal 28, as described with reference to the preceding embodiments. The electronic instruments 54S are connected to the common heat transfer unit 52 by the heat conductive path members 20. The heat conductive path member 20 have the second thermal terminal 38. In a large size electronic apparatus having a number of unit housings, it is possible to save the installation space and reduce the production cost by connecting a plurality of electronic instruments to a common heat exchanger unit.

As described above, according to the present invention, it is possible to obtain an air-cooled electronic apparatus having an excellent cooling capacity, without the necessity of enlarging a heat sink for an integrated circuit unit.

What is claimed is:

1. An electronic apparatus comprising:
    a circuit board;
    a connector provided on the circuit board;
    an integrated circuit module attached to the connector;
    a heat sink attached to the integrated circuit module;
    heat transfer means disposed at a position separate from the heat sink and arranged in a cooling air passageway for transferring heat, wherein the connector the integrated circuit module and the heat sink are arranged on one side of the circuit board, and the heat transfer means is arranged on the other side of the circuit board; and
    a heat conduction path for thermally connecting the heat sink to the heat transfer means.

2. An electronic apparatus as defined by claim 1, wherein the heat conduction path comprises a heat pipe.

3. An electronic apparatus as defined by claim 1, wherein the heat sink has a first thermal terminal, and the heat conduction path has a second thermal terminal capable of being thermally brought into contact with the first thermal terminal.

4. An electronic apparatus as defined by claim 3, wherein the second thermal terminal, the heat conduction path and the heat transfer means form an integral heat transfer unit, and the heat transfer unit is attached to a frame via a heat transfer unit mounting means which has a degree of freedom of movement in three dimensions.

5. An electronic apparatus as defined by claim 4, wherein the heat transfer unit includes a duct forming the cooling air passageway, and an elastic unit member is provided between the heat transfer means and the duct or the frame for biasing the heat transfer means so that the first thermal terminal is brought into contact with the second thermal terminal.

6. An electronic apparatus as defined by claim 3, wherein the first thermal terminal and the second thermal terminal are mechanically coupled with each other.

7. An electronic apparatus as defined by claim 1, wherein a circuit element other than the integrated circuit module is mounted to the surface of the circuit board on the opposite side from that carrying the connector for mounting the integrated circuit module.

8. An electronic apparatus as defined by claim 1, wherein a circuit element other than the integrated circuit module is mounted to the surface of the circuit board on the side carrying the connector for mounting the integrated circuit module, the circuit element having a heat sink for the circuit element, the heat sink for the circuit element being thermally connected to the heat transfer means via the heat conduction path.

9. An electronic apparatus as defined by claim 4, wherein the heat transfer means is a device separated from the electronic apparatus carrying the integrated circuit module.

10. An electronic apparatus as defined by claim 3, wherein an introduction part of the second thermal terminal is tapered and made of an elastic material.

11. An electronic apparatus as defined by claim 4, wherein a plurality of electronic equipments are connected to the single heat transfer unit.

* * * * *